UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION.

BLUE DISAZO-DYE AND PROCESS OF MAKING SAME.

No. 860,221.   Specification of Letters Patent.   Patented July 16, 1907.

Application filed March 22, 1907. Serial No. 363,940.

*To all whom it may concern:*

Be it known that I, AUGUST LEOPOLD LASKA, doctor of philosophy, chemist, and a resident of 5 Gerberstrasse, Offenbach-on-the-Main, in the Grand Duchy of Hessen, Germany, have invented new and useful Improvements in Blue Disazo Coloring-Matter and Process of Making Same, of which the following is a specification.

My invention relates to the manufacture of new disazo coloring matter obtained by combining tetrazotized diamido bases with one molecular proportion of a naphthol disulfoacid and one molecular proportion of 2 arylamido 5 naphthol 7 sulfoacid. These dyestuffs dye cotton violet to blue tints of excellent brightness surpassing in this point similar commercial azodyestuffs. The 2 arylamido 5 naphthol 7 sulfonic acid employed in the manufacture of these dyestuffs renders them fast to sodium carbonate, so that a neutral or alkaline bath can be used in dyeing.

The following example will serve to illustrate the nature of my invention; parts being by weight: A solution of the tetrazo-compound obtained from 12,2 parts of dianisidin in the well known manner is poured into an ice cold alkaline solution of 17,4 parts of 1 naphthol 3:6 disulfoacid (neutral sodium salt) in 200 parts of water, and after formation of the intermediate product a solution of 16 parts of 2 phenylamido 5 naphthol 7 sulfoacid, neutralized by means of sodium carbonate, is added. The mixture is stirred for 12 hours, heated up to 70° C. and the dyestuff precipitated by addition of common salt. The coloring matter, in a dry state being a black powder, dissolves in concentrated sulfuric acid to a greenish blue, in water to a reddish blue solution. The color of this solution is hardly altered by addition of caustic soda lye or hydrochloric acid. On cotton the dyestuff produces very bright blue tints.

In place of the 1 naphthol 3:6 disulfoacid naphthol sulfoacids of the constitution $OH:SO_3H:SO_3H = 1:3:7$, 1:3:8, 1:4:6, 1:4:7, 1:4:8, 1:5:7, 2:3:6, 2:3:7 or 2:5:7 can be used, and the 2 phenylamido 5 naphthol 7 sulfoacid can be replaced by any other arylcompound f. i. by tolylamido naphthol sulfoacid. All the dyestuffs thus obtained dye cotton very bright blue tints. In employing other diamido-bases, f. i. benzidin or tolidin, dyestuffs result which dye cotton more reddisher shades.

Now what I claim and desire to secure by Letters Patent is the following:

1. The process of manufacturing new cotton dyestuffs, which consists in combining the tetrazocompounds of the said diamidobases with one molecular proportion of a naphthol disulfoacid and one molecular proportion of 2 arylamido = 5 naphthol 7 sulfoacid.

2. The process of manufacturing new cotton dyestuffs, which consists in combining the tetrazocompound of dianisidin with one molecular proportion of a naphthol-disulfoacid and one molecular proportion of 2 arylamido 5 naphthol 7 sulfoacid.

3. As a new article of manufacture the azocoloring matter obtained by combining the tetrazocompound of dianisidin with one molecular proportion of a naphthol disulfoacid and one molecular proportion of 2 arylamido 5 naphthol 7 sulfoacid, being a black powder dissolving in concentrated sulfuric acid to a greenish blue, in water to a reddish blue solution, and dyeing cotton very bright blue shades.

4. As a new article of manufacture the dyestuffs obtained by combining the tetrazocompound of dianisidin with one molecular proportion of 1 naphthol 3:6 disulfoacid and one molecular proportion of 2 arylamido 5 naphthol 7 sulfoacid, being black powders, dissolving in concentrated sulfuric acid to a greenish blue, in water to a reddish blue solution, and dyeing cotton very bright blue shades.

In testimony, that I claim the foregoing as my invention, I have signed my name in presence of two witnesses, this seventh day of March 1907.

AUGUST LEOPOLD LASKA.

Witnesses:
EVA SATTLER,
HERMANN WEIL.